United States Patent
Zohar et al.

(10) Patent No.: US 7,313,654 B2
(45) Date of Patent: Dec. 25, 2007

(54) METHOD FOR DIFFERENTIAL DISCARDING OF CACHED DATA IN DISTRIBUTED STORAGE SYSTEMS

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: XIV Ltd, Tel-Aviv (IL)

( * ) Notice: Subject to any disclaimer, the term of this patent is extended or adjusted under 35 U.S.C. 154(b) by 430 days.

(21) Appl. No.: 10/974,152

(22) Filed: Oct. 27, 2004

(65) Prior Publication Data

US 2006/0090036 A1    Apr. 27, 2006

(51) Int. Cl.
G06F 12/12 (2006.01)
(52) U.S. Cl. ...................................... 711/134
(58) Field of Classification Search ................ 711/133, 711/134
See application file for complete search history.

(56) References Cited

U.S. PATENT DOCUMENTS

| | | | |
|---|---|---|---|
| 4,928,239 A * | 5/1990 | Baum et al. ................ 711/136 |
| 5,381,539 A | 1/1995 | Yanai et al. | |
| 5,513,336 A | 4/1996 | Vishlitzky et al. | |
| 5,592,432 A | 1/1997 | Vishlitzky et al. | |
| 5,682,500 A | 10/1997 | Vishlitzky et al. | |
| 5,706,467 A | 1/1998 | Vishlitzky et al. | |
| 5,765,213 A | 6/1998 | Ofer | |
| 5,983,324 A | 11/1999 | Ukai et al. | |
| 6,715,039 B1 | 3/2004 | Michael et al. | |
| 2002/0087802 A1* | 7/2002 | Al-Dajani et al. .......... 711/137 |
| 2005/0289301 A1* | 12/2005 | Woo et al. .................. 711/137 |

* cited by examiner

*Primary Examiner*—Kevin L. Ellis
(74) *Attorney, Agent, or Firm*—Katten Muchin Rosenman LLP

(57) ABSTRACT

As part of some embodiments of the present invention, there is provided a method, a circuit and a system for managing data in a cache memory of a mass data storage device and/or system. In accordance with some embodiments of the present invention, a data portion's priority in the cache may be altered. The priority of the data portion may be altered as a function of an access parameter associated with the data portion and a fetch parameter associated with the data portion.

61 Claims, 5 Drawing Sheets

METHOD FOR DIFFERENTIAL DISCARDING OF CACHED DATA IN DISTRIBUTED STORAGE SYSTEMS

FIELD OF THE INVENTION

The present invention generally relates to the field of digital memory storage. More specifically, the present invention relates to a system, method and circuit for managing data in a cache memory of a mass data storage device and/or system.

BACKGROUND OF THE INVENTION

A data storage system is typically able to service "data write" or "data read" requests issued by a host computer. A host may be connected to the storage system's external controller or interfaces (IF), through various channels that transfer both data and control information (i.e. control signals). Physical non-volatile media in which data may be permanently or semi-permanently stored includes arrays of disk devices, magnetic or optical, which are relatively less expensive than semiconductor based volatile memory (e.g. Random Access Memory) but are relatively much slower in being accessed.

A cache memory is a high-speed buffer located between an IF and the disk device(s), which is meant to reduce the overall latency of Input/Output (I/O) activity between the storage system and a host accessing data on the storage system. Whenever a host requests data stored in a memory system, the request may be served with significantly lower latency if the requested data is already found in cache, since this data must not be brought from the disks. As of the year 2004, speeds of IO transactions involving disk activity are typically on the order of 5-10 milliseconds, whereas IO speeds involving cache (e.g. RAM memory) access are on the order of several nanoseconds.

The relatively high latency associated with disk activity derives from the mechanical nature of the disk devices. In order to retrieve requested data from a disk based device, a disk controller must first cause a disk reading arm to physically move to a track containing the requested data. Once the head of the arm has been placed at the beginning of a track containing the data, the time required to read the accessed data on the relevant track is relatively very short, on the order of several microseconds.

One criteria or parameter which is often used to measure the efficiency of a cache memory system or implementation is a criteria referred to as a hit ratio. A hit ratio of a specific implementation is the percentage of "data read" requests issued by the host that are already found in cache and that consequently did not require time intensive retrieval from disk operations. An ideal cache system would be one reaching a 100% hit ratio.

Intelligent cache algorithms aimed at rising the level of hit ratio to a maximum are often based on two complementary principles: (1) "prefetching", namely, guessing in advance which portions of data in the disk devices will likely be requested by the host in order to retrieve these data portions into the cache in advance, in anticipation of a future read request from the host; and (2) replacement procedures that establish a "discard priority". The discard priority relates to data portions which are already stored in the cache, and is responsible for managing the order by which each of the data portions that are currently stored in the cache are to be discarded.

The various approaches to the management of the discard priority queue attempt to anticipate which of the data portions currently stored in the cache are the least likely to be requested by the host, and set the priority queue accordingly. Thus, whenever cache space is required for fetching new data into the cache, the discard priority queue is consulted, and the data portions which have been determined to be the least likely to be requested by the host are discarded first in order to free up cache storage space which may be used for storing the newly fetched data. From another perspective, the various approaches to the management of the discard priority queue are intended to increase the likelihood that those portions of data that have been determined to be the most likely to be requested by the host will not be discarded prematurely in order to free up space or for any other purpose.

An illustration of a replacement queue is shown in FIG. 1A, to which reference is now made. FIG. 1A illustrates a virtual list that is representative of a replacement queue, the list illustrates the relationship between the various slots (slot 1000 (0) through slot 1000($k$)) in an exemplary replacement queue. Here, slot 1000 (0) is the "head" of the replacement queue. In other words, slot 1000 (0) is positioned at the top of the list of slots to be purged or replaced, when there is a need for an available slot to store incoming data blocks or segment(s), for example, prefetched data segments arriving from one or more disk devices associated with the cache memory. Slot 1000 ($k$) is the "tail" of the replacement queue and is currently at the bottom of the list of slots to be purged or replaced.

The various approaches towards managing a discard priority queue are also commonly referred to as "replacement procedures". Replacement procedures known in the art can be implemented by creating a doubly linked list of data portions found in the cache. This list is referred to herein as a replacement queue. In a common replacement queue, the data portions are added to the replacement list in the order by which they are retrieved from the disk, and some indication or pointer are associated with the portion that was most recently added to the list. When a new data portion is to be added to the cache, the structure of the replacement queue in combination with the pointer dictate the portion in the cache that is to be discarded in order to free up storage space for the new data portion. Some implementations use both a "head" pointer and a "tail" pointer identifying, respectively, the beginning and the end of the replacement queue. In cache implementations in which certain data portions are defined as permanently residing in cache, these two pointers will not necessarily be adjacent to one another in the linked list. Having implemented a replacement queue with either one or two pointers, replacement schemes or procedures known in the art are applied to manage the replacement queue. Examples of some replacement schemes include: FIFO (first-in first-out: replace the block that has been in cache for the longest time), LRU (Least Recently Used: replace the data portion that has not been used for the longest time), LFU (Least Frequently used), MFU (Most Frequently Used), or Random Selection.

The basic approaches to implementing replacement procedures in cache memories may be further enhanced in several ways, by dynamically and differentially modifying the position of a data portion in the replacement queue. Relocating data sequences within a cache is referred to herein as a "promotion" if the relocation is intended to increase the amount of time the data portion remains in the cache. Relocation of data sequences in the cache may improve the efficiency of the basic cache algorithm. Each relocation of a data sequence in the cache involves some cache management operations and may therefore also incur a certain performance cost. It is therefore desirable to balance the benefit associated with the replacement activity with the performance cost associated with each data sequence relocation within the cache.

Thus, by way of example, in case an LRU scheme is implemented, the determining factor implemented by LRU scheme is the period of time that elapsed since a particular data portion was read into the cache or was accessed while in the cache. The basic LRU approach prescribes that whenever a data portion is accessed while being in cache, it is promoted to the tail of the queue since it has turned into the "most recently used" portion.

In a slightly modified approach, if the elapsed time since the data portion has been accessed is less than a predetermined threshold, the data portion will not be relocated and will remain in the same location in the replacement queue, thus saving a number of cache management operations. The predetermined threshold can be established, by way of example, as the average fall through time (FTT) of prior data portions in the memory.

In a second modified LRU approach the number of times a data portion had been accessed while in the memory is compared to a fixed number. If the number of times the data portion had been accessed is above the fixed number, the data portion is placed at the tail of the replacement queue, causing the data portion to remain in the cache for a longer period of time. U.S. Pat. No. 5,592,432 to Vishlitzky, et al., describes such cache management implementations. U.S. Pat. No. 6,715,039 to Michael, et al., describes a method for promoting a data portion within a cache, which takes into consideration the balance between the underlying performance costs and the associated gains. The method disclosed in the '432 Patent seeks to determine whether the probability of losing a cache hit is greater than the ratio between the performance cost associated with the promotion of the portion and the benefit associated with the cache hit.

It should be noted that all of the above modifications to the basic cache memory replacement scheme require periodical calculations of global parameters and statistics in the system, such as the FTT or the probabilities of losing a cache hit as indicated, or, alternatively, the number of times that a data portion is accessed, all of which incur overhead costs.

A second aspect of cache management concerns the prefetch algorithms. Prefetch algorithms attempt to guess or anticipate in advance which portions of data stored on a disk device are anticipated to be requested by a host within a short period of time. The prefetch algorithms include one or more triggers which activate the retrieval of the data sequences from the disk devices into the cache when on or more criteria are met. The criteria implemented in the prefetch algorithms are usually defined in a manner so as to optimize the hit ratio achieved by the use of this particular algorithm, and are aimed at maximizing the number of retrieved sequences which are eventually requested by the host within a relatively short time, thereby enhancing system performance.

Prefetch algorithms known in the art commonly fall into one of two categories. The First category or group includes algorithms which are based on the identification of sequential streams of read requests. If the storage system is able to identify that the host is issuing requests for sequential streams it may assume that this kind of activity will be maintained for a while and, accordingly, calculate which additional portions of data are likely to be requested by the host within a short period of time, and may send these additional portions to the cache in advance. U.S. Pat. No. 5,682,500 to Vishlitzky, et al., describes a prefetch method that follows this approach.

A second group of prefetch algorithms includes algorithms which are based on the identification of "hot zones" in the system. A statistical analysis of recent activity in the system may show that a certain area, defined in advance as a potential "hot zone", is being intensely addressed by the host, and consequently, a mechanism is triggered to bring into the cache all the data contained in that zone. The underlying assumption is that such data portions tend to be addressed in their totality, or in their majority, whenever they are addressed over a certain threshold of focused activity. U.S. Pat. No. 5,765,213 to Ofer, describes a prefetch method that follows an approach similar to this.

One may notice that these two kinds of approaches to prefetch algorithms require a considerable amount of resources in order to monitor current activity, decide on the prefetch, and then implement the prefetch in a coordinated manner across the system. U.S. patent application Ser. No. 10/914,746 entitled "System Method and Circuit For Retrieving Data into a Cache Memory From a Mass Data Storage Device", filed on Aug. 9, 2004, describes a third group of prefetch algorithms, which require minimal overhead. The third group of prefetch algorithms includes algorithms which are based on fetching into the cache data portions when one or more relatively simple criteria which may be tested on the data portion in question are met. Thus, when implementing this third group of prefetch algorithms no global considerations or comparison with other data portions in the system are required. By way of example, one such criterion may be that in a certain read request or in a series of read requests, the percentage of blocks that are associated with a specific data portion in the disk exceeds a predefined threshold. Further by way of example, a second criterion may be that in a certain read request or in a series of read requests, the first n blocks in the specific data portion have been requested by the host.

The policies set forth by the prefetch algorithms may affect the replacement procedures and vice-versa. Thus, the implementation of prefetch algorithms may present additional factors which may influence the performance of the replacement procedures and that therefore should be taken into account when implementing a replacement procedure in the system. Indeed, if the prefetch algorithm in question is excessively aggressive, there is a danger of data flushing by prefetched data portions. Even if the prefetch algorithm is very successful and the great majority of prefetched data will eventually be used by the host, the gain in terms of increased hit-ratio associated with the intensive prefetch activity may not justify the "blockage" of relatively large portions of the available cache space which may not enable the caching of other IO activity in the system. This problem is addressed by the definition of a "microcache", exclusively devoted to prefetched data. A maximum number of allowed prefetched data portions are predefined, and when this number is exceeded, the cache space corresponding to previously used data portions is reused or recycled to write new prefetched data. U.S. Pat. No. 5,381,539, to Yanai et al., describes a prefetch method that implements an idea of this kind. Moreover, depending on the current overall workload stress in the system, as measured by the FTT in the cache, it is possible to temporarily activate or deactivate the use of the microcache or to change its basic operation parameters. U.S. Pat. No. 5,706,467 to Vishlitzky, et al., describes a cache management scheme that follows this approach.

On the other hand, it is also desirable to ensure that data portions that were prefetched will not be replaced by other data prematurely, for example, before the host had a chance to use that data. One way of achieving this goal may include, by way of example, defining a certain prefetch stop condition applying to read requests. Thus, for a certain cache space may be exclusively allocated to store prefetched sequences, and may be configured to prevent additional prefetch activity once the cache space exclusively allocated to store the prefetched sequences has been fully populated by data portions not yet read by the host. This and similar algorithms are described in U.S. Pat. No. 5,983,324, to Ukai et al.

Yet another, related problem to be taken into consideration when implementing cache management algorithms concerns the handling of "write-pending data". Write pending data is data which had been written by the host into cache, and already acknowledged by the system, but which has not yet been destaged into the permanent media. In general, cache space allocated to data portions that are write-pending should be preferably returned to the main memory pool as quickly as possible in order to free up cache storage space for data portions that the host is requesting, and that typically are considered of a higher level of priority. On the other hand, it is possible that these write-pending data portions might themselves be candidates for being requested by the host within a short period of time, in which case it may be desirable to retain these write-pending data portions in memory until they are actually read. Based on statistics, such as the current FTT of the cache and the number of times that a given data portion in cache has been accessed over a period of time, for example, it is possible to define algorithms that are capable of efficiently managing the cache replacement procedure taking into consideration the specific factors associated with an the replacement of write-pending portions which may effect the efficiency of these algorithms. U.S. Pat. No. 5,513,336 to Vishlitzky, et al., already mentioned above, describes cache management schemes that follow this approach.

The existing cache management procedures demand significant overhead operations and procedures in the storage system, which may cause the overall performance of the storage system to diminish. Such overhead activity or procedure may entail continuous operations which may be necessary to obtain and maintain system-wide statistics and to measure parameters associated with the behavior of individual data portions, and, in addition the overhead activity and procedures may produce increased data traffic within the system communication lines. Moreover, cache storage devices that implement global lock operations as part of their design, will incur increased applications of this lock, due to both the prefetch activity and the cache management routines. In cases sequential prefetch operations result in the creation and management of a microcache, such as described above, additional overhead and resource use is added to the cache manager or cache controller.

There is therefore a need for a method, a system and a circuit for implementing a cache replacement procedure requiring relatively low overhead. There is a further need for a method, a system and a circuit for implementing a cache replacement procedure wherein analysis is performed locally and wherein the analysis requires only the examination of the requested data-portion, independently of its relations with other portions in the system. There is yet a further need for a method, a system and a circuit for implementing a cache replacement procedure, wherein at least a portion of the global statistics, comparison and internal information transmission are not necessary for the implementation of the cache replacement procedure.

SUMMARY OF THE INVENTION

As part of some embodiments of the present invention, there is provided a method, a circuit and a system for managing data in a cache memory of a mass data storage device and/or system. In accordance with some embodiments of the present invention, a data portion's priority in the cache may be altered. The priority of the data portion may be altered as a function of an access parameter associated with the data portion and a fetch parameter associated with the data portion.

In accordance with further embodiments of the present invention the fetch parameter may be characterized by a value indicating that the data portion was prefetched into the cache. In accordance with further embodiments of the present invention, the access parameter may be characterized by a value indicating that the data portion had been accessed while in the cache.

In accordance with yet further embodiments of the present invention, the fetch parameter may indicate the type of prefetch activity that brought the data portion into the cache. In accordance with some embodiments of the present invention the value of the fetch parameter may be dependent upon the type of prefetch activity that caused the data portion to be prefetched into the cache. In accordance with some embodiments of the present invention, the access parameter may indicate the type of access activity that occurred while the data portion has been in the cache.

In accordance with further embodiments of the present invention, a data portion may be checked to determine whether the data portion is a prefetched data portion. The data portion may also be checked to determine whether the data portion had been accessed while in the cache. In accordance with some embodiments of the present invention, the data portion's priority in the cache may be altered if the data portion is a prefetched data portion and if the data portion had been accessed while in the cache.

In accordance with some embodiments of the present invention a cache may include a promotion module. In accordance with some embodiments of the present invention, the promotion module may be adapted to alter a data portion's priority in the cache as a function of an access parameter associated with the data portion and a fetch parameter associated with the data portion.

In accordance with some embodiments of the present invention, a storage system may include a cache memory. In accordance with some embodiments of the present invention the cache memory may be adapted to initiate a promotion procedure. In accordance with some embodiments of the present invention, the promotion procedure may be adapted to alter a data portion's priority in the cache as a function of an access parameter associated with the data portion and a fetch parameter associated with the data portion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
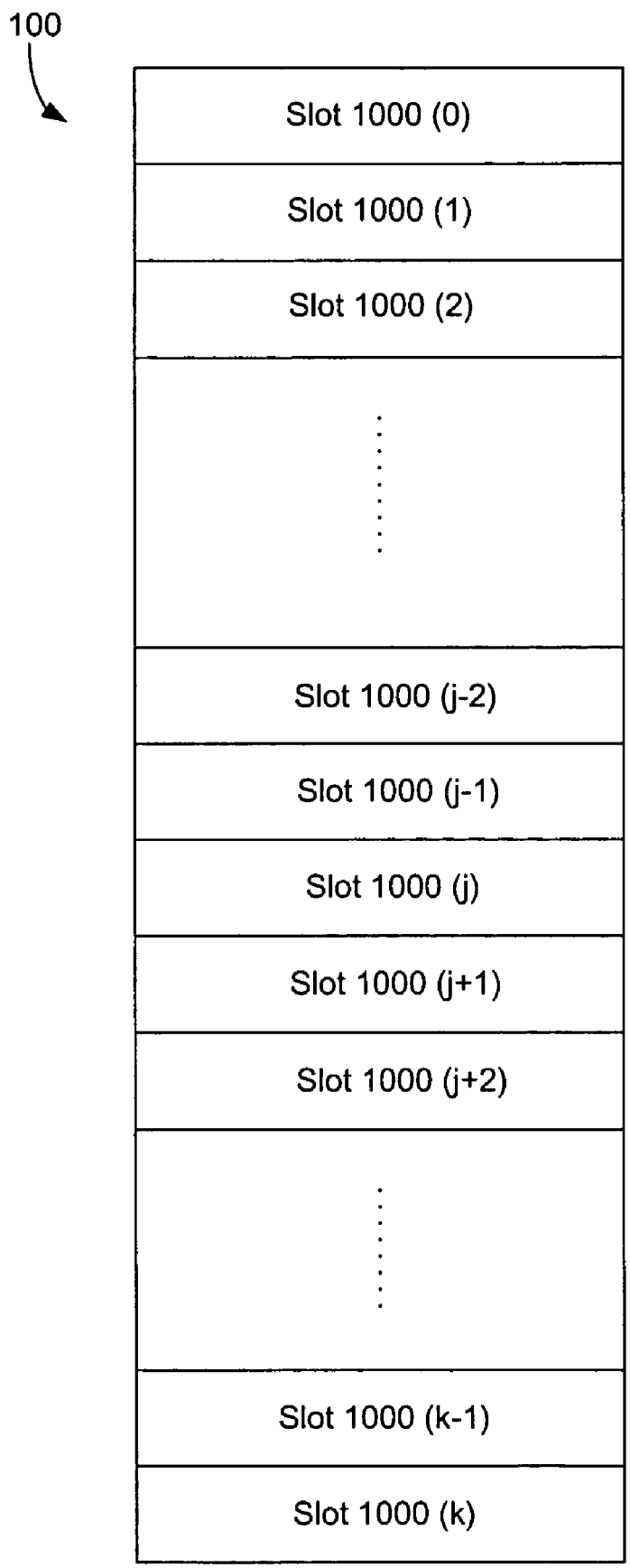
FIG. 1A is an illustration of a virtual list that is representative of a replacement queue in a cache memory.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF POSSIBLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Reference is now made to FIG. 1A, which is a schematic block diagram of one possible storage system configuration which may include a cache memory, as part of some embodiments of the present invention. As part of some embodiments of the present invention, the system 10 may service IO requests generated by one or more host computers 52. The host computers 52 may be connected to the storage system 10 through ports or interfaces 26, either directly or via a distributed data network 50. The storage system 10 may include one or more cache memories 24 and disk devices 22. The data may be permanently stored in the disk devices 22 (e.g. burned optical disk) or may be semi-permanently stored in the disk device 22 (e.g. magnetic disk or semi-conductor based non-volatile mass memory arrays). As part of some embodiments of the present invention, the storage system 10 may further include interface (IF) components 26 and switches 23 and 25, e.g. fabric switches. The IF components 26 may be adapted to communicate with the cache components 24 over a first fabric switch 25, and the cache components 24 may be similarly adapted to communicate with the disk devices 22 over a second fabric switch 23. As part of some embodiments of the present invention, the cache devices 24 may be adapted to perform prefetch operations to pre-store data from one or more disk devices 22.

As part of some embodiments of the present invention, the cache devices 24 may include a replacement module and a promotion module (not shown). In accordance with some embodiments of the present invention, the replacement module and the promotion module may be configured to implement a replacement procedure and a promotion procedure, respectively. The replacement procedure in combination with the promotion procedure may be configured to manage the data replacement in the cache memory. The replacement module, the promotion module, the replacement procedure and the promotion procedure will be discussed in greater detail hereinbelow.

Figure 1B:
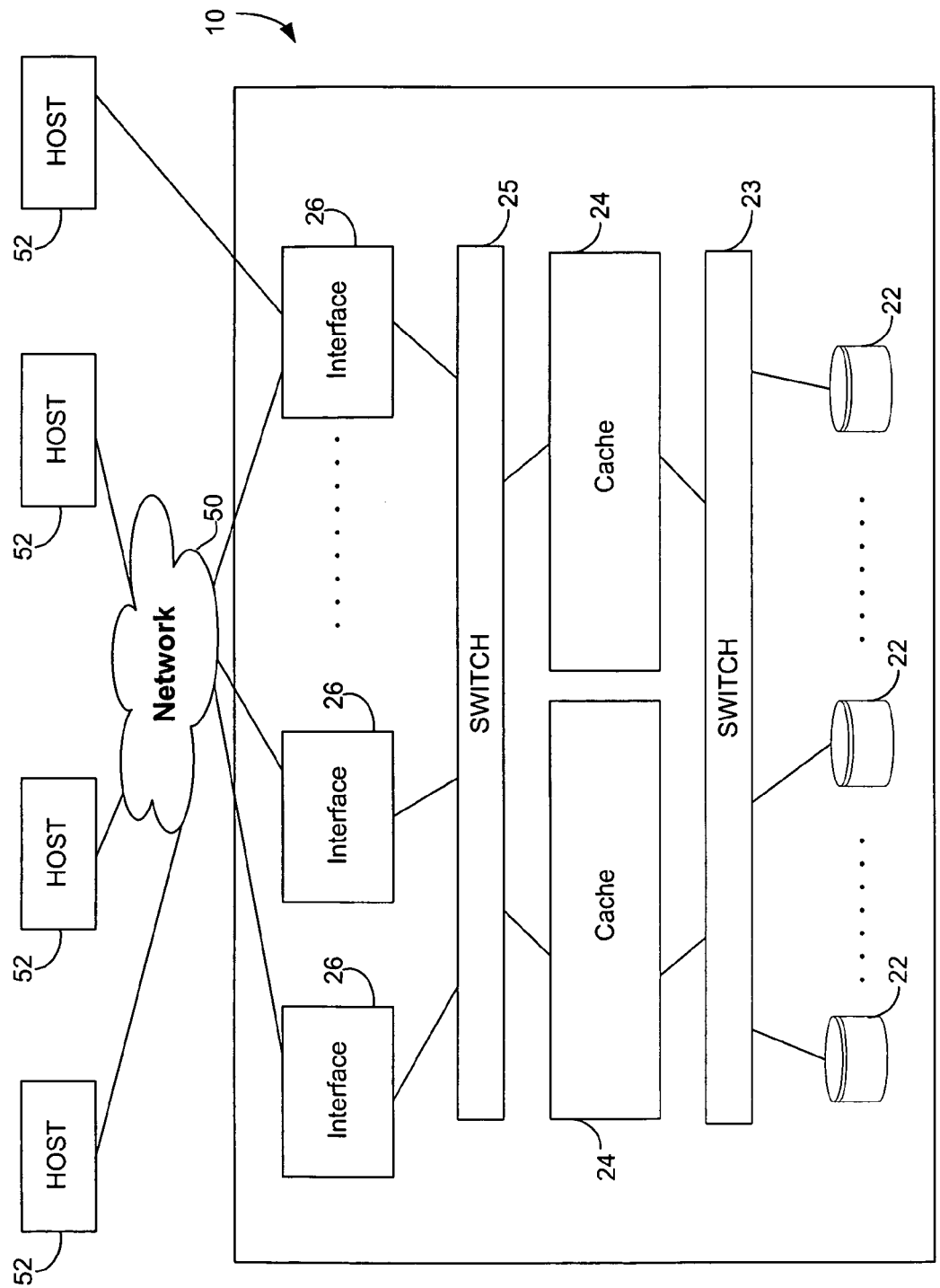
FIG. 1B is a schematic block diagram of one possible storage system configuration which may implement a cache replacement circuit, system or method, as part of some embodiments of the present invention.

It should be noted that the storage system 10 shown in FIG. 1B and described hereinabove is one possible implementation of a storage system including a cache replacement circuit, system or method, as part of some embodiments of the present invention. The system 10 shown in FIG. 1 and described hereinabove is exemplary in nature, and other possible storage systems having different architectures may be used as part of some embodiments of the present invention.

Figure 2:
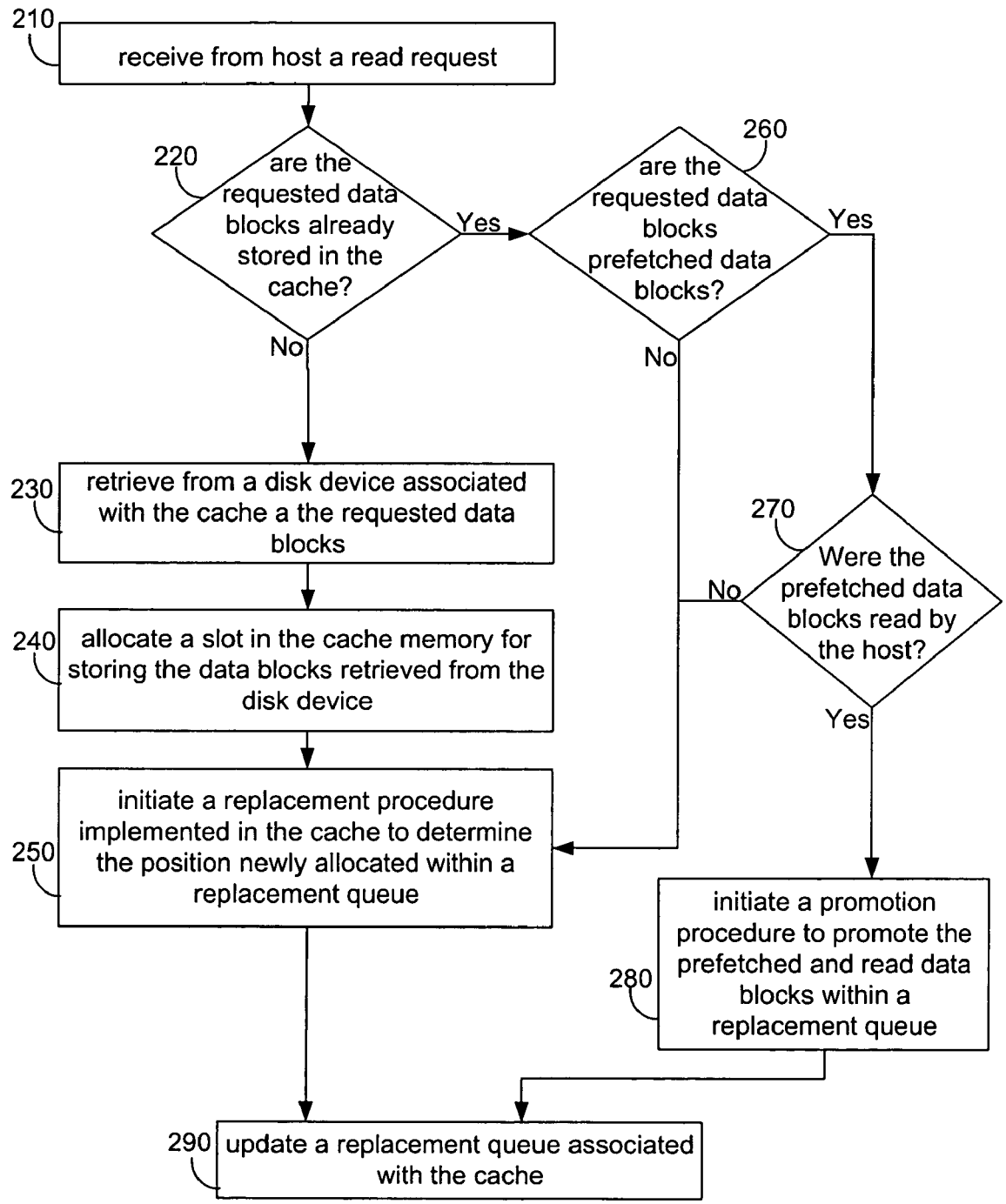
FIG. 2 is a block diagram illustration of a method of managing data in a cache, in accordance with some embodiments of the present invention.

Reference is now made to FIG. 2 which is a flowchart illustrating a method of managing data in a cache, in accordance with some embodiments of the present invention. In accordance with some embodiments of the present invention, initially, the host may transmit to the cache a read request and the cache may receive the request from the host (block 210). Next, the cache may check whether the data blocks requested by the host are already stored in the cache (block 220).

In accordance with some embodiments of the present invention, in case the requested data blocks are not found in the cache, one or more data segments (or data portions) including the requested data blocks may be retrieved from one or more disk devices associated with the cache (block 230). A slot or slots in the cache memory may be allocated for storing the data segment(s) retrieved from the disk device(s) (block 240). When the fetched data segment(s) arrives at the cache, the data segment(s) may be stored in the allocated slot(s).

In accordance with some embodiments of the present invention, a standard replacement procedure associated with the cache may be initiated (block 250). In accordance with some embodiments of the present invention the standard replacement procedure associated with the cache may be used to manage a replacement queue associated with the cache. The replacement queue may be used to control the replacement of the stored in the cache memory.

In accordance with some embodiments of the present invention, the cache replacement procedure may be utilized to determine which currently used slot of the cache should be purged, so that a slot is made available to receive and store new data in place of the data that was previously stored in the slot prior to the purging of that data. In accordance with some embodiments of the present invention, the replacement procedure may be configured to determine the position of the slot used to store the retrieved data within the replacement queue associated with the cache. In accordance with some embodiments of the present invention, the purging of the old data and the replacement procedure may be initiated immediately prior to the retrieval of the requested data blocks from the disk(s).

In accordance with one exemplary embodiment of the present invention, the cache may be associated with a replacement queue implementing a LIFO replacement procedure, such that when the retrieved data segment(s) arrives at the cache and is stored in the allocated slot(s), the LIFO replacement queue may be updated and the newly retrieved data may be associated with the tail of the LIFO list, or in other words, the slot that is associated with the newly retrieved data is positioned at the top of a list (e.g., first) of slots to be purged or replaced when cache storage space is required, for example, when the cache is full and new prefetch activity requires that fetched data segments be stored in the cache.

The LIFO replacement procedure, to which reference may be made throughout the description of some embodiments of the present invention, is an example of one well-known replacement procedure which is commonly used to manage data replacement in a cache memory. It should be noted, however, that the reference to the LIFO replacement procedure is exemplary in nature, and is used for convenience purposes. It should be further noted, that the present invention is not limited to the use of any one particular standard replacement procedure, and that any standard replacement procedure known in the present or yet to be devised in the future, including , but not limited to the LRU replacement procedure (Least Recently Used: replace the data portion that has not been used for the longest time), the FIFO replacement procedure (first-in first-out: replace the block that has been in cache for the longest time), the LIFO replacement procedure (last-in first-out), the LFU replacement procedure (Least Frequently used), the MFU replacement procedure (Most Frequently Used), or the Random Selection replacement procedure may be used in accordance with some embodiments of the present invention.

In accordance with some embodiments of the present invention, in case that the requested data blocks are already found in the cache (e.g., the requested data blocks are already stored in the cache), the cache may proceed to check whether the requested data blocks already stored in the cache are prefetched data blocks (block 260). In other words, the cache may check whether the requested data blocks are part of a prefetched segment that is already stored in the cache.

In accordance with some embodiments of the present invention, the cache may check a fetch parameter associated with the data segment to determine whether the data segment had been prefetched into the cache. The fetch parameter may be configured to indicate whether the data segment was prefetched into the cache or not. For example, in case that the data segment had been brought into the cache as a result of a prefetch activity, the fetch parameter associated with the data segment may be assigned a first value, whereas in case that no prefetch activity was involved in the caching of the data segment, the fetch parameter may be assigned a second value.

In accordance with some embodiments of the present invention, if the requested data blocks are not prefetched data blocks, the standard replacement procedure may be initiated to determine the position within the replacement queue of the requested blocks or of a cache slot associated with the requested blocks (block 250).

In accordance with some exemplary embodiments of the present invention, if at block 250 it is determined that the requested data blocks are not prefetched data blocks the position within the replacement queue of the requested blocks or of a cache slot associated with the requested blocks, may be determined in accordance with the ordinary methodology of the replacement procedure. In this case, the fact that the requested blocks are already stored in the cache will not affect the position of the requested blocks within the replacement queue, and the activity associated with the requested blocks may be regarded by the replacement procedure as a simple access activity for example. In case that a LIFO replacement procedure is used, for example, the position of the slot(s) associated with the requested data blocks within the replacement queue may remain unchanged.

In accordance with some embodiments of the present invention, if it is determined that the requested data blocks are prefetched data blocks stored in the cache, the cache may proceed to check whether the prefetched data blocks were read by the host while in the cache (blocks 270).

In accordance with some embodiments of the present invention, the cache may check an access parameter associated with the data segment to determine whether the data segment had accessed while in the cache. The access parameter may be configured to indicate whether the data segment had been accessed while in the cache or not. For example, in case that the data segment had been accessed while the data segment was stored in the cache, the access parameter associated with the data segment may be assigned a first value, whereas in case that the data segment had not been accessed, the access parameter may be assigned a second value.

If it is determined that the prefetched data blocks were not read by the host, the cache may proceed to update the replacement queue associated with the cache in accordance with the predefined rules of the replacement procedure implemented in the cache, and the fact that the requested blocks are prefetched and are already stored in the cache will not affect the position of the requested blocks within the replacement queue (block 250). In this case, the activity associated with the requested blocks may be regarded by the replacement procedure as a simple access activity, for example. For illustration, in case that a LIFO replacement procedure is implemented in the replacement queue associated with the cache, the position of the slot(s) associated with the requested data blocks may remain unchanged.

However, in accordance with some embodiments of the present invention, if it is determined at block 270 that the prefetched data blocks were read by the host, the cache may initiate a promotion procedure (block 280). In accordance with some embodiments of the present invention, the promotion procedure may be configured to override the replacement procedure utilized by the cache. In accordance with further embodiments of the present invention, the promotion procedure may be configured to promote a certain data segment (or data portion) within the replacement queue. In accordance with further embodiments of the present invention, the promotion procedure may be configured to promote the requested data segment further up the replacement queue in comparison to the position in which same data segment would have been placed by the replacement procedure.

In accordance with some embodiments of the present invention, the promotion procedure may be implemented as an override sub-procedure within the replacement procedure. In this case, the replacement procedure may be configured to initiate either the ordinary methodology or the promotion procedure or the promotion procedure when certain criteria are met. For example, the replacement procedure may be adapted to initiate the promotion procedure only when it is determined that certain data blocks (or data segment(s)), which have been requested by a host, are prefetched data blocks which are already stored in the cache memory, and which had been previously accessed while stored in the cache memory.

However, it should be noted that the present invention is not limited in this respect and that the replacement procedure and the promotion procedure may be otherwise linked. For example, in accordance with some embodiments of the present invention, the replacement procedure and the promotion procedure may be two discrete procedures. In this case, in accordance with some embodiments of the present invention, the replacement procedure and the promotion procedure may be in communication with one another either directly or through a controller. Similar to the above description, when the promotion procedure is initiated it may override the replacement procedure and may determine the position of the data blocks or segment of the cache slot that is associated with the data blocks of segment within the replacement queue.

In accordance with further embodiments of the present invention, the promotion procedure may be adapted to promote within the replacement queue, a data segment(s) or a slot associated with a data segment which is determined to have been partly or wholly prefetched from a disk and that the prefetched data segment has also been at least partially accessed or read by the cache.

It should be noted that although throughout the specification and the claims the procedure or sub-procedure, which is initiated to override the replacement procedure, may sometimes be referred to as a "promotion" procedure, the present invention is not limited to the promotion of data blocks or data segments which have been determined to have been prefetched into the cache and accessed while in the cache. Rather, in accordance with some embodiments of the present invention, the promotion procedure may be adapted to otherwise change the position (or the relative position) within the cache replacement queue of the data blocks or data segment(s) or the cache slots associated with the data blocks. For example, in accordance with some embodiments of the present invention, the promotion procedure may be adapted to demote a slot associated with a prefetched and accessed data segment within the cache replacement queue.

Furthermore, it should be noted that in accordance with some embodiments of the present invention, in some cases, the promotion procedure may be configured to promote (or demote) the requested data blocks to the tail (or to the head) of the list of cached data segments or slots to be purged. However, in accordance with further embodiments of the present invention, in some cases, the promotion procedure may be configured to promote (or demote) the requested data blocks only part of the way towards the tail (or the head) of the list of cached data segments or slots to be purged.

In accordance with further embodiments of the present invention, the promotion procedure may be configured to provide several levels of promotion based on one or more criteria. Thus, the promotion procedure may be adapted to position a certain requested data segment or a slot associated with the requested data segment at different positions within the replacement queue in accordance with one or more criteria associated with the requested segment.

For example, in accordance with some embodiments of the present invention, a requested data segment which was prefetched into the cache may be promoted by the promotion procedure to the tail (or towards the tail) of the cache replacement queue when the data segment was prefetched into the cache as a result of a specific type or types of prefetch activity, while other requested data segments may be demoted to the head (or towards the head) of the cache replacement queue, or may be promoted less aggressively (either by the promotion procedure or by the standard replacement procedure). In accordance with further embodiments of the present invention, a requested data segment which had been accessed while in the cache may be promoted by the promotion procedure to the tail (or towards the tail) of the cache replacement queue, when the access activity is of a specific type or when the access activity is associated with one or more specific access parameters or thresholds, while in other cases, the requested data segments may be demoted by the replacement procedure to the head (or towards the head) of the cache replacement queue, or may be promoted less aggressively.

For example, in accordance with some embodiments of the present invention, the promotion procedure may be configured to promote a certain data segment to the tail of the replacement queue, if that data segment had been accessed more than a certain number of times while in the cache. The same data segment may be promoted less aggressively towards the tail of the replacement queue if the number of times it had been accessed while in the cache is less than that certain number. Alternatively, in case that the number of times that the requested data segment had been accessed while in the cache is less than that a certain number, the standard replacement procedure may be initiated, and the promotion procedure shall remain non-active and shall not affect the position of the requested data segment within the replacement queue. In a further example, in accordance with some embodiments of the present invention, when a requested data segment was prefetched into cache as part of a sequential IO activity, the promotion procedure may demote the requested data segment to the head of the replacement queue, such that the requested data segment may be replaced immediately after being read by the host. However, in accordance with some embodiments of the present invention, when a requested data segment was prefetched into cache as part of a random activity (for example, as part of a "hot-zone" prefetch activity which may occur in random IO situations), the promotion procedure may demote the requested data segment to the tail of the replacement queue, such that the requested data segment is in the positioned at the end of the replacement queue.

Those or ordinary skill in the art may appreciate that the type of prefetch activity that is associated with a specific data segment, at least a portion of which had been prefetched into the cache, may effect the desirability or the priority, of replacing that data segment. The desirability of replacing a certain data segment may be associated with the profit or loss in terms of hit-ratio versus the cost or gain in resources and performance. For example, when a requested data segment was prefetched into cache as part of a sequential IO activity, the data segment will typically be read only once by the host. In this case, it may be desirable to discard the prefetched data segment immediately after being read by the host. However, a data segment which had been prefetched into the cache as part of random activity (for example, as part of a "hot-zone" prefetch activity which may occur in random IO situations), typically, will not have arrived into cache by an obvious, easily repeating procedure. Since this procedure is less obvious and repetitive it may be desirable to keep within the cache a data segment which had been prefetched in this manner for a longer period of time. Those of ordinary skill in the art may further appreciate that the type and/or the frequency or any other parameter associated with the access activity that is associated with a specific data segment may similarly affect the desirability or the priority, of replacing that data segment.

Figure 3:
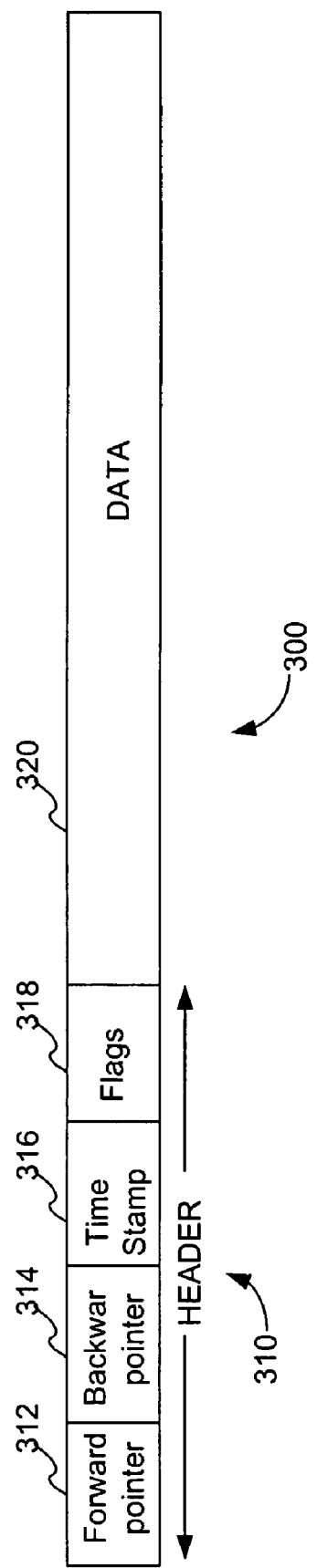
FIG. 3 is a graphic illustration of a data segment in a storage system, as part of some embodiments of the present invention.

Reference is now made to FIG. 3, which is a graphic illustration of a data segment in a storage system, as part of some embodiments of the present invention. As part of some embodiments of the present invention, a data segment 300 in the storage system 10 may include a data payload portion 320 and a header portion 310. As part of some embodiments of the present invention, the header portion 310 may include various metadata blocks, for example, a backward pointer 314 and a forward pointer 312, one or more time stamps 316, and one or more flags 318. In accordance with some embodiments of the present invention, the content and the composition of the various metadata blocks included in the header 310 may be constant or may be configured to change dynamically. For example, additional time stamp blocks 316 or flag blocks may be added over time to the header, or in another example the content of the forward and/or the backward point 312 and 314 may be changed.

As part of some embodiments of the present invention, the backward pointer 314 may indicate where in the cache memory, a data segment that immediately precedes the data segment 300 in the replacement queue is stored. The forward pointer 312 may indicate where in the cache memory, a data segment that immediately follows the data segment 300 in the replacement queue is stored.

In accordance with some embodiments of the present invention, the time stamps 316 may be used to record one or more time parameters. For example, the time in which a certain event associated with the data segment occurred, and/or the duration of such an event. In accordance with some embodiments of the present invention, the time stamp 316 may be used to record the time in which the data segment 300 was most recently accessed. In accordance with further embodiments of the present invention, the time stamp 316 may be used to indicate the amount of time that a least recently accessed data portion has resided within the cache. The time stamp 316 may be used in addition or in alternative to indicate the average period of time that a prefetched data block is residing within the cache. The time stamp may be used to record a plurality of additional time parameters either in addition or in alternative to the time parameters discussed above.

In accordance with some embodiments of the present invention, the flags 318 may be used to indicate the occurrence of one or more predefined events. In accordance with some embodiments of the present invention, the flags 318 may be used to indicate whether a certain data segment is a prefetched data segment. As part of some embodiments of the present invention, when a data segment 300 is prefetched into the cache, one or more flags 318 of that data segment 300 may be used to indicate that the data segment 300 is a prefetched data segment. In accordance with further embodiments of the present invention, the flags 318 may also be used to indicate whether a certain data segment had been accessed while in the cache. In accordance with yet further embodiments of the present invention, the flags 318 may be used to indicate whether a certain data segment is a prefetched data segment, and only if the data segment is a prefetched data segment an additional flag may be allocated in the data segment 300 to indicate whether the prefetched data segment 300 had been accessed while in the cache. As part of some embodiments of the present invention, the flags 318 may be used to indicate the occurrence of other events associated with the data segments.

In accordance with some embodiments of the present invention, when one or more requested data blocks are found to have already been stored in the cache as part of a certain data segment 300, the cache may check the metadata 310 of that data segment 300 to determine whether that data segment 300 is a prefetched data segment. In case it is determined that the data segment which includes the requested data blocks is a prefetched data segment which is already stored in the cache, the cache may proceed to check the metadata 310 of that data segment 300, to determine whether that data segment 300 had been accessed while in the cache. In case it is determined that the data segment 300 is a prefetched data segment which had been accessed while in the cache, a promotion procedure may be initiated, as described above. Otherwise, a standard replacement procedure is initiated, as described above.

In accordance with some embodiments of the present invention, the decision to initiate the promotion procedure or the replacement procedure may be further dependent upon additional criteria. The metadata 310 of the data segment 300 may be checked to determine whether such additional criteria are met or not. For example, the cache may be configured to initiate the promotion procedure only when the requested data blocks are part of a prefetched data segment which is already stored in the cache and which had been accessed within a certain period of time before the request for the data blocks was received. In this case, in addition to the flags 318, the time stamp 316 may be checked to determine how much time passed since the data segment that includes the requested blocks had been accessed, and whether the standard replacement procedure or the promotion procedure should be initiated. Alternatively, in accordance with another exemplary embodiment of the present invention, a flag may be used to indicate that the amount of time that passed since the data segment was last accessed exceeds a predetermined threshold, and therefore, the standard replacement procedure should be initiated rather then the promotion procedure.

In accordance with some embodiments of the present invention, one or more flags 318 associated with a certain data segment 300 may also be used to indicate that the data segment 300 had been prefetched as part of a specific type of prefetch activity and/or that the data segment 300 has undergone a specific access activity while in the cache or that the access activity is associated with one or more specific access parameters or thresholds. In accordance with some embodiments of the present invention, the promotion procedure may be affected by the type of prefetch activity which resulted in the prefetching of the data segment and/or by the type of access activity that a certain data segment has undergone while in the cache. In accordance with further embodiments of the present invention, the promotion procedure may be configured to more aggressively promote a certain data segment when the data segment was prefetched as a result of specific kind(s) of prefetch activity and or when the segment has undergone a specific type of access activity while in the cache.

In accordance with some embodiments of the present invention, the flags 318 may be used to indicate what kind of prefetch activity was associated with the prefetching of a certain data segment 300 into the cache. In accordance with some embodiments, the flags 318 may be used to indicate under what conditions the data segment was fetched into the cache and/or which criteria triggered the prefetch activity. In accordance with one embodiment of the present invention, one flag 318 associated with a certain data segment 300 may be used to indicate that the data segment 300 had been prefetched into the cache, and another flag may be used to indicate that the data segment 300 was prefetched as part of a particular kind of prefetch activity (for example, hot-zone prefetch activity) or under what conditions the data segment was fetched into the cache and/or which criteria triggered the prefetch activity.

It should be noted that the present invention is not limited to the data segment shown in FIG. 3. As part of some embodiments of the present invention, the size of each data segment and the metadata section may either be constant or may be variable. Each element in the metadata section (e.g. the flags, the time stamp or the pointers) may include one or more bits. Moreover, it should be noted that as part of some embodiments of the present invention the payload data and/or the metadata need not necessarily be consecutive and may rather be separately stored in the cache. For example, as part of some embodiments of the present invention, the cache may include separate arrays of payload data and of metadata and the two may be linked to each other. Some portions of a data segment's payload or metadata may also be fragmented and may not necessarily be stored in a consecutive batch.

Figure 4:
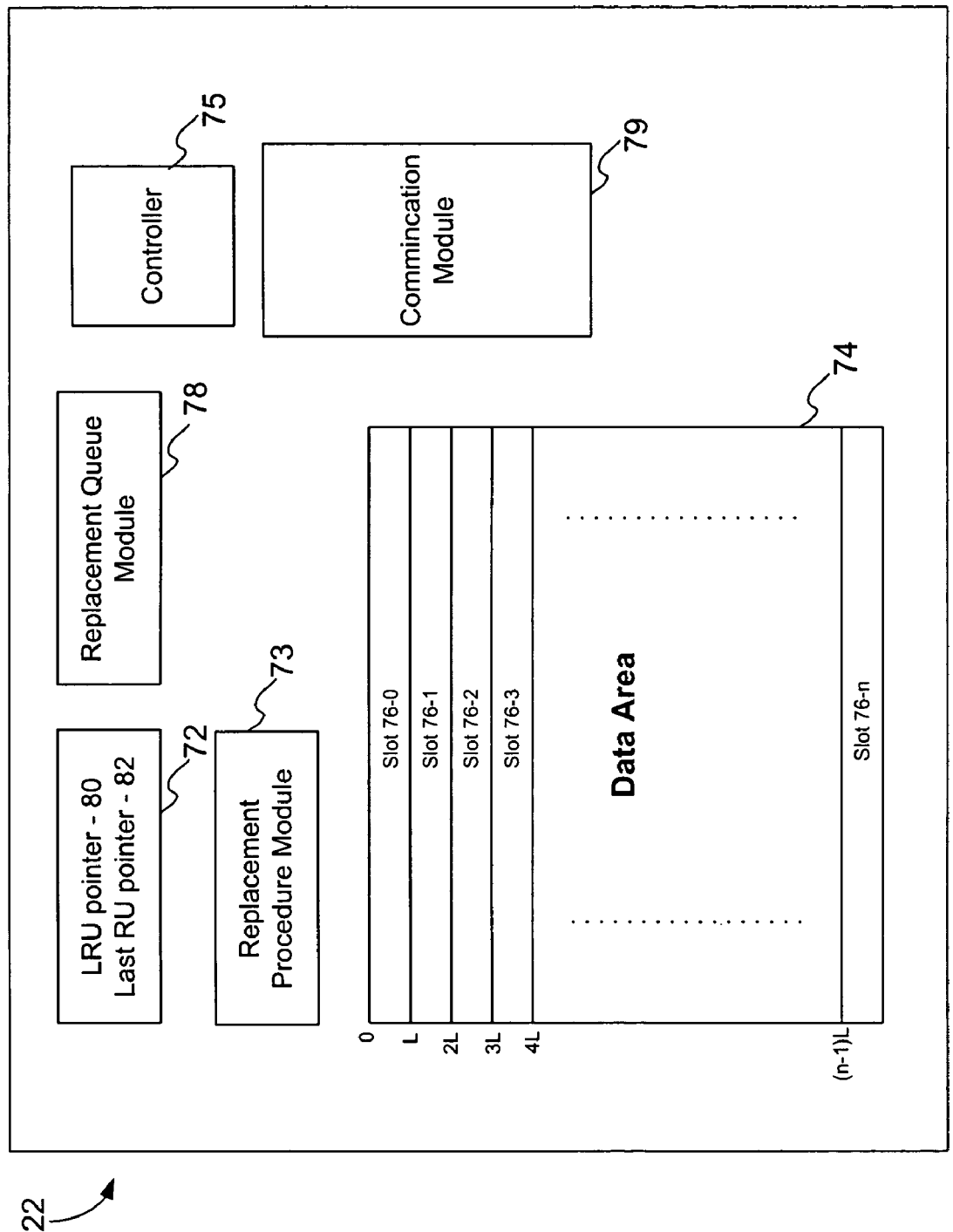
FIG. 4 is a block diagram illustration of a cache memory in accordance with some embodiments of the present invention.

Reference is now made to FIG. 4, which is a block diagram illustration of a cache memory in accordance with some embodiments of the present invention. The cache 22 in the embodiment shown may implement an LRU replacement procedure. The cache may include an LRU replacement procedure module 72, a replacement procedure module 73, a data area 74, a controller 75, a replacement queue module 78 and a communication module 80.

In accordance with some embodiments of the present invention, the data area 74 of the cache 22 may be used to store data segments. Here the data area 74 include n+1 slots (marked 76(0) through 76(n)) which may used to store data segments, including prefetched data segments retrieved from one or more disk devices associated with the cache 22. Each slot may be equal in size (L) to any of the other slots. However, it should be apparent to those of ordinary skill in the art that the present invention is not limited in this respect. Rather, in accordance with some embodiments of the present invention, some cache memories may include a different number of slots and the size of the slots may not be constant. The size of the slots may also be dynamically changed by the cache 22, for example, in order to optimize system performance or to accommodate different sizes of data segments brought into the cache 22.

In accordance with some embodiments of the present invention, the communication module 79 may be adapted to enable the cache to communicate with other devices, either within the storage system or outside, and either directly or through various interfaces. In accordance with some embodiments of the present invention, the controller 75 may be adapted control the operation of the cache 22 and the various elements of the cache 22.

For example, in accordance with some embodiments of the present invention, the controller 75 may be adapted to determine whether a certain requested data segment (or data blocks) is already stored in the cache 22. In accordance with further embodiments of the present invention, the controller 75 may be adapted to read one or more parameters stored in one or more flags and/or time stamps associated with a certain requested data portion or segment. Thus, in accordance with some embodiments of the present invention, the controller 75 may be adapted to determine whether the data segment is a prefetched data segment. In accordance with further embodiments of the present invention, the controller 75 may be adapted to determine whether the data segment had been accessed while in the cache. In accordance with yet further embodiments of the present invention, the controller 75 may be adapted to determine the type of prefetch activity that brought a certain data segment into the cache and/or the type of access activity that occurred while the data portion has been in the cache.

In accordance with some embodiments of the present invention, the LRU replacement procedure module 72 may be configured to store an LRU pointer 80 (a pointer to the least recently used segment or slot) and a pointer to the most recently used segment or slot 82. The LRU replacement procedure module 72 may be adapted to manage the replacement queue module 78 as discussed above with greater detail.

It should be noted that the present invention is not limited to the use of an LRU replacement procedure and any common replacement procedure may be used, in accordance with some embodiments of the present invention, as mentioned above. In addition, it should be noted that the present invention is not limited to the use of the LRU procedure implementation illustrated in FIG. 4 (annotated 72), and that other implementations of the LRU replacement procedure may be used, in accordance with some embodiments of the present invention.

In accordance with some embodiments of the present invention, the promotion procedure module 78 may be adapted to promote or demote a data segment or slot within the replacement queue implemented by the replacement queue module 78, as discussed above with greater detail.

In accordance with some embodiments of the present invention, the LRU replacement procedure module 72 and the promotion procedure module 73 may be in communication with the replacement queue module 78. In accordance with some embodiments of the present invention, the promotion procedure 73 may be adapted to override the LRU replacement module 72 when certain criteria are met, as described in more detail hereinabove. For example, in accordance with some embodiments of the present invention, the controller 75 may be adapted to disable the standard replacement procedure and initiate the promotion procedure when certain criteria are met. In accordance with some embodiments of the present invention, the promotion procedure module 73 may be adapted to promote (or demote) a certain data segment (or slot) further up (or down) the replacement queue in comparison to the position in which same data segment would have been placed by the LRU replacement procedure module 72, as described in greater detail hereinabove.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of managing data in a cache comprising: altering a data portion's priority in the cache as a function of an access parameter associated with the data portion indicating that at least a predetermined portion of data blocks in the data portion had been accessed while in the cache, and as a function of a fetch parameter associated with the data portion.

2. The method of claim 1, wherein the access parameter is characterized by a value indicating that the data portion had been accessed while in the cache.

3. The method of claim 2, wherein the fetch parameter is characterized by a value indicating that the data portion was prefetched into the cache.

4. The method of claim 3, wherein said altering comprises initiating a promotion procedure to alter the data portion's priority in the cache.

5. The method of claim 4, wherein the promotion procedure is configured to override a standard replacement procedure.

6. The method of claim 5, wherein the data portion's priority in the cache is altered by the promotion procedure in comparison to the priority which would have been set by the standard replacement procedure.

7. The method of claim 5, wherein the standard replacement queue is selected from a group of: FIFO, LIFO, LRU, MRU, LFU, MFU and Random Selection.

8. The method of claim 3, wherein the fetch parameter may indicate the type of prefetch activity that brought the data portion into the cache.

9. The method of claim 8, wherein the value of the fetch parameter may be dependent upon the type of prefetch activity that caused the data portion to be prefetched into the cache.

10. The method of claim 9, wherein the value of the fetch parameter may be associated with one or more of the following: the criteria which triggered the prefetch activity, the amount of data blocks in the prefetch data portion and the relative number of prefetched data blocks out of the total number of data block in the data portion.

11. The method of claim 2, wherein the access parameter may indicate the type of access activity that occurred while the data portion had been in the cache.

12. The method of claim 11, wherein said altering comprises altering a data portion's priority in the cache as a function of an access parameter associated with the data portion indicating that a specific type of access activity occurred while the data portion had been in the cache and a fetch parameter associated with the data portion.

13. The method of claim 12, wherein the access parameter may indicate that a read access activity occurred while the data portion had been in the cache.

14. The method of claim 12, wherein the access parameter may indicate that a write access activity occurred while the data portion had been in the cache.

15. The method of claim 12, wherein the access parameter may indicate that a sequential write access activity occurred while the data portion had been in the cache.

16. The method of claim 2, wherein the access parameter may further indicate what portion of the data portion had been accessed while in the cache.

17. The method of claim 1, wherein the access parameter may indicate that at least a predetermined portion of the data blocks in the data portion had been accessed while in the cache.

18. The method of claim 1, wherein the access parameter may indicate that at least one or more specific data blocks in the data portion had been accessed while in the cache.

19. The method of claim 1, wherein said altering further comprises altering a data portion's priority in the cache as a function of one or more time parameters associated with data stored within the cache.

20. The method of claim 19, wherein the time parameter is associated with the data portion.

21. The method of claim 19, wherein the time parameter is associated with one or more time stamps associated with one or more data portions within the cache.

22. The method of claim 19, wherein the time parameter is configured to indicate the amount of time that a least recently accessed data portion has resided within the cache.

23. The method of claim 19, wherein the time parameter is configured to indicate the average period of time that a prefetched data block is residing within the cache.

24. The method of claim 19, wherein the time parameter is configured to indicate the amount of time that a most recently prefetched data portion has resided within the cache.

25. The method of claim 19, wherein the time parameters are configured to indicate the amount of time that each of one or more randomly selected fetched data blocks has resided within the cache.

26. The method of claim 1, wherein said altering comprises initiating a promotion procedure if the data portion is a prefetched data portion and if the data portion had been accessed while in the cache.

27. The method of claim 1, wherein said altering comprises initiating a demotion procedure when the data portion is a prefetched data portion and the data portion had been accessed while in the cache.

28. The method of claim 26, wherein said altering further comprises initiating a standard replacement procedure when the data portion is not a prefetched data portion and/or if the data portion had not been accessed while in the cache.

29. The method of claim 28, wherein said altering comprises selecting between a standard replacement procedure, a promotion procedure and a demotion procedure based on a fetch parameter and/or an access parameter.

30. A cache comprising: a promotion module; wherein the promotion module is adapted to alter a data portion's priority in the cache as a function of an access parameter associated with the data portion indicating that at least a predetermined portion of data blocks in the data portion had been accessed while in the cache, and as a function of a fetch parameter associated with the data portion.

31. The cache of claim 30, further comprising a standard replacement procedure module.

32. The cache of claim 31, further comprising a controller adapted to select between said promotion procedure module and said standard replacement procedure module.

33. A storage system comprising: a cache memory adapted to initiate a promotion procedure to alter a data portion's priority in the cache as a function of an access parameter associated with the data portion indicating that at least a predetermined portion of data blocks in the data portion had been accessed while in the cache, and as a function of a fetch parameter associated with the data portion.

34. A method of managing data in a cache comprising:
altering a data portion's priority in the cache as a function of an access parameter associated with the data portion and a fetch parameter associated with the data portion; wherein said altering further comprises altering a data portion's priority in the cache as a function of one or more time parameters associated with data stored within the cache; and
wherein the time parameter is associated with one or more time stamps associated with one or more data portions within the cache.

35. The method of claim 34, wherein the access parameter is characterized by a value indicating that the data portion had been accessed while in the cache.

36. The method of claim 35, wherein the fetch parameter is characterized by a value indicating that the data portion was prefetched into the cache.

37. The method of claim 36, wherein said altering comprises initiating a promotion procedure to alter the data portion's priority in the cache.

38. The method of claim 37, wherein the promotion procedure is configured to override a standard replacement procedure.

39. The method of claim 38, wherein the data portion's priority in the cache is altered by the promotion procedure in comparison to the priority which would have been set by the standard replacement procedure.

40. The method of claim 38, wherein the standard replacement queue is selected from a group of: FIFO, LIFO, LRU, MRU, LFU, MFU and Random Selection.

41. The method of claim 36, wherein the fetch parameter may indicate the type of prefetch activity that brought the data portion into the cache.

42. The method of claim 41, wherein the value of the fetch parameter may be dependent upon the type of prefetch activity that caused the data portion to be prefetched into the cache.

43. The method of claim 42, wherein the value of the fetch parameter may be associated with one or more of the following: the criteria which triggered the prefetch activity, the amount of data blocks in the prefetch data portion and the relative number of prefetched data blocks out of the total number of data block in the data portion.

44. The method of claim 35, wherein the access parameter may indicate the type of access activity that occurred while the data portion had been in the cache.

45. The method of claim 44, wherein said altering comprises altering a data portion's priority in the cache as a function of an access parameter associated with the data portion indicating that a specific type of access activity occurred while the data portion had been in the cache and a fetch parameter associated with the data portion.

46. The method of claim 45, wherein the access parameter may indicate that a read access activity occurred while the data portion had been in the cache.

47. The method of claim 45, wherein the access parameter may indicate that a write access activity occurred while the data portion had been in the cache.

48. The method of claim 45, wherein the access parameter may indicate that a sequential write access activity occurred while the data portion had been in the cache.

49. The method of claim 35, wherein the access parameter may further indicate what portion of the data portion had been accessed while in the cache.

50. The method of claim 49, wherein said altering comprises altering a data portion's priority in the cache as a function of an access parameter associated with the data portion indicating that at least a predetermined portion of the data blocks in the data portion had been accessed while in the cache and a fetch parameter associated with the data portion.

51. The method of claim 50, wherein the access parameter may indicate that at least a predetermined portion of the data blocks in the data portion had been accessed while in the cache.

52. The method of claim 50, wherein the access parameter may indicate that at least one or more specific data blocks in the data portion had been accessed while in the cache.

53. The method of claim 34, wherein the time parameter is associated with the data portion.

54. The method of claim 34, wherein the time parameter is configured to indicate the amount of time that a least recently accessed data portion has resided within the cache.

55. The method of claim 34, wherein the time parameter is configured to indicate the average period of time that a prefetched data block is residing within the cache.

56. The method of claim 34, wherein the time parameter is configured to indicate the amount of time that a most recently prefetched data portion has resided within the cache.

57. The method of claim 34, wherein the time parameters are configured to indicate the amount of time that each of one or more randomly selected fetched data blocks has resided within the cache.

58. A method of managing data in a cache comprising: altering a data portion's priority in the cache as a function of an access parameter associated with the data portion and a fetch parameter associated with the data portion; wherein said altering further comprises altering a data portion's priority in the cache as a function of one or more time parameters associated with data stored within the cache; and wherein the time parameter is configured to indicate the amount of time that a least recently accessed data portion has resided within the cache.

59. A method of managing data in a cache comprising: altering a data portion's priority in the cache as a function of an access parameter associated with the data portion and a fetch parameter associated with the data portion; wherein said altering further comprises altering a data portion's priority in the cache as a function of one or more time parameters associated with data stored within the cache; and wherein the time parameter is configured to indicate the average period of time that a prefetched data block is residing within the cache.

60. A method of managing data in a cache comprising: altering a data portion's priority in the cache as a function of an access parameter associated with the data portion and a fetch parameter associated with the data portion; wherein said altering further comprises altering a data portion's priority in the cache as a function of one or more time parameters associated with data stored within the cache; and wherein the time parameter is configured to indicate the amount of time that a most recently prefetched data portion has resided within the cache.

61. A method of managing data in a cache comprising: altering a data portion's priority in the cache as a function of an access parameter associated with the data portion and a fetch parameter associated with the data portion; wherein said altering further comprises altering a data portion's priority in the cache as a function of one or more time parameters associated with data stored within the cache; and wherein the time parameters are configured to indicate the amount of time that each of one or more randomly selected fetched data blocks has resided within the cache.

* * * * *